July 24, 1956  W. W. TAYLOR  2,755,820
CUSHION DOME FOR A CONDUIT
Filed June 27, 1952
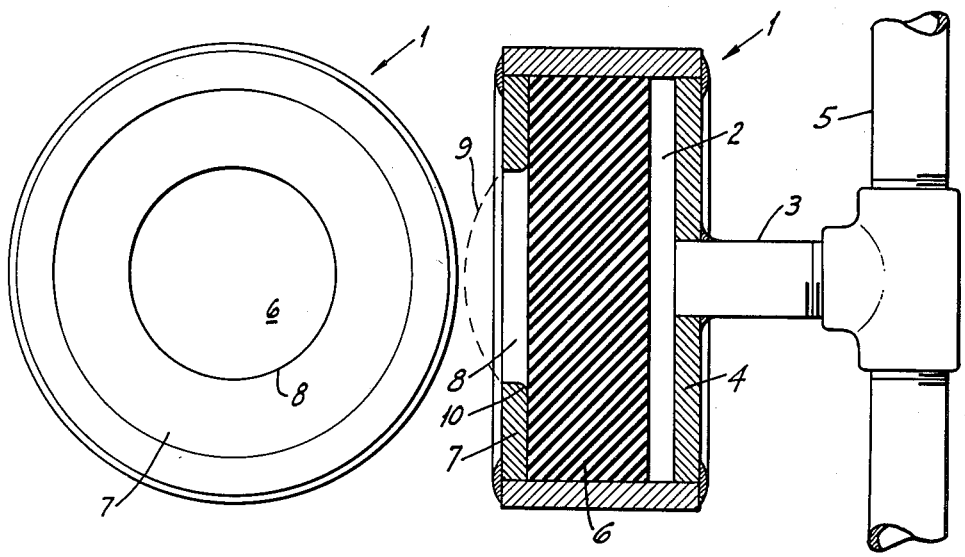
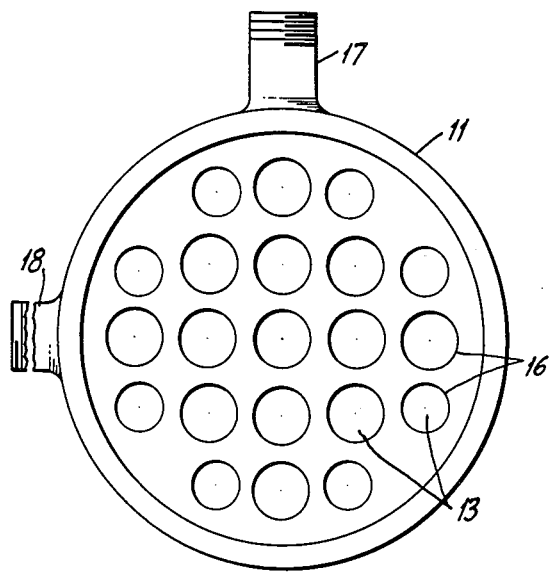
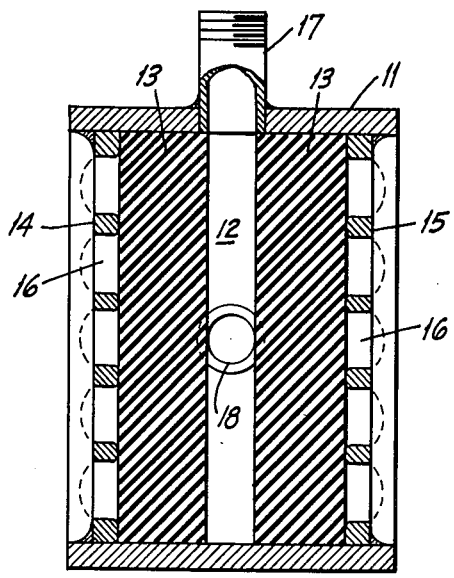
INVENTOR.
Walter W. Taylor
BY
A. Schapp
ATTORNEY

2,755,820

CUSHION DOME FOR A CONDUIT

Walter W. Taylor, Oakland, Calif., assignor to Malsbary Manufacturing Company, Inc., Oakland, Calif., a corporation of California Application June 27, 1952, Serial No. 295,907

3 Claims. (Cl. 138—26)

The present invention relates to improvements in a cushion dome for a conduit, adapted for cushioning or damping pulsations in the conduit due to the starting and stopping of a flow of liquid through the conduit.

My invention was developed for use particularly in connection with the Malsbary machine, as illustrated, for instance, in Patent No. 2,295,228, in which a liquid is pumped through a pipe line by means of a reciprocating pump against a head, but it may be used to advantage in any installation in which it becomes necessary to provide cushioning means for absorbing or damping shocks due to the starting and stopping of a flow of liquid through a pipe line.

Heretofore, the common expedient for cushioning the shocks has been the well-known air dome in which a body of compressed air is confined with respect to the water passing through the line so as to be subject to the pressure thereof. But these air domes usually have to be of considerable size as compared with the remainder of the installation, and are subject to the further handicap that the passing water or other liquid tends to entrain the air so that, as a rule, specific means have to be provided for continuously re-supplying the air to the dome to compensate for the continuous loss of air.

In the present invention it is proposed to provide a simple cushioning means which does not depend upon the presence of a compressed body of air, and which can be built into a compact structure of relatively small proportions.

More particularly, it is proposed to provide a relatively small housing forming a chamber communicating with the liquid conduit, the housing having an opening to the atmosphers, and to use a heavy rubber cushion covering the opening and cooperating therewith in allowing a limited section of the cushion to play or vibrate in the opening in response to the pulsations in the conduit.

Further objects and advantages of my invention will appear as the specification continues, and the new and novel features of my cushion dome will be fully defined in the claims hereto attached.

The preferred forms of my invention are illustrated in the accompanying drawing, forming part of this application, in which:

Figure 1 shows a central section through one form of my cushion dome;

Figure 2, an end view thereof;

Figure 3 shows a central section through another form of cushion dome; and

Figure 4, an end view thereof.

While I have shown only the preferred forms of my invention, I wish to have it understood that various changes or modifications may be made within the scope of the claims attached hereto, without departing from the spirit of the invention.

Referring to the drawing in detail, and first to the form shown in Figures 1 and 2, my cushion dome comprises in its principal features, a cylindrical housing 1, preferably made of metal of suitable thickness and strength, and forming a cylindrical chamber 2, a short pipe 3 projecting from one end 4 of the housing and communicating, at one end, with the chamber 2, and at the other end, with a conduit 5, and a heavy disc 6 of rubber material bearing against the other end 7 of the housing, the latter end being formed with a central opening 8.

The conduit 5 may be considered a pipe line through which a liquid is pumped under pressure against a head, as for instance a nozzle secured upon the end of a hose connecting with the pipe line.

The short pipe 3 allows the liquid of the conduit to enter into the chamber 2 and to bear on the disc 6. The latter is made of solid and impervious rubber or similar material which is resilient and elastic, and is made to snugly fit the housing and to cover the opening 8.

The disc 6 is not attached to the housing and is free to expand against the housing to make a liquid tight seal when under pressure. It is sufficiently heavy to prevent the liquid pressure from forcing it through the opening 8 and sufficiently elastic to automatically re-assume its normal position, with flat opposing faces, when the pump is at rest and the pressure is relieved.

However, when the pump is operating, the ensuing pressure will cause the limited section of the disc facing the opening to bulge outward through the opening as indicated in dotted lines at 9, the inner edge of the opening being curved, as at 10, to prevent the latter from cutting into the rubber material.

This bulging section serves essentially as the shock absorber for the system. It substantially retains its bulging position while the pump is in operation, but vibrates, within relatively narrow limits, in response to pulsations in the main line or conduit to absorb or cushion the pulsations, and to generally perform the same function usually assigned to an air dome heretofore.

While all dimensions of the present structure naturally depend upon the specific characteristics of the installation in which the cushion dome is to be used; I will, not by way of limitation, but merely to enable experts skilled in the art to develop their own designs in accordance with their particular requirements, give the approximate dimensions and measurements of the form shown in Figures 1 and 2, which is in successful operation on a pipe line in which a single cylinder pump operating at 800 R. P. M. and at 100 pounds pressure pumps water at the rate of 90 gallons per hour.

In this instance, the cylinder has an inner diameter of four inches, and the opening 8 is located centrally and has a diameter of two and one-half inches. The rubber disc has a snug fit in the cylinder and has a thickness of one and one-quarter inches. The rubber is fairly flexible, with a durometer reading of approximately 30.

These measurements will change, of course, with different installations, the principal idea being that the rubber should be of a thickness and elasticity, with respect to the size of the opening and the pressures involved, to cause the disc to substantially retain its form under the pressure, to expand against the wall of the housing to form a seal, to bulge outward through the opening under pressure, in the manner indicated, to vibrate at the bulge in response to pulsations, and to return to normal position when the pump ceases to operate.

While there may be many variations in the general arrangement, I have shown one modified form in Figures 3 and 4 of the drawing, this modification being intended for an installation in which higher pressures are involved.

In this form I provide a larger cylindrical housing 11 having a central chamber 12 midway the length thereof and having rubber discs 13 on opposite sides of the chamber, the two discs bearing against the ends 14 and 15 of the cylinder. Instead of providing a single large opening in the center of each end, I use a relatively large number of openings 16 of smaller size, taking care that the openings do not come too close to the rim.

In this form the discs may be of approximately the same thickness as previously described, but may be slightly harder, testing approximately 40 on a durometer reading.

The cushion dome may be arranged alongside of the conduit as in the form first described, or may be connected into the line, as by an inlet 17 and an outlet 18 communicating with the chamber 12.

As in the first form, the pressure of the liquid will force the two discs against the cylinder wall to form seals, while limited portions of the discs will bulge through the openings and vibrate in response to pump pulsations to cushion the shock thereof.

I claim:

1. A cushion dome for a conduit having means for pumping a liquid therethrough under pressure, comprising a housing having a chamber communicating with the conduit and having an unobstructed opening in the wall thereof and leading to the atmosphere, and a confined sealing member within the chamber and normally bearing upon the rim of the opening under pressure of the liquid for sealing the opening, the sealing member being made of solid soft rubber material operable by the pressure of the liquid to partly flow into the opening under the pressure of the liquid and to pulsate in said opening in response to the pulsations in the flow of the liquid, and the rim of the opening facing the sealing member being rounded to prevent the same from cutting into the sealing member.

2. A cushion dome for a conduit having means for pumping a liquid therethrough under pressure, comprising a housing having a chamber communicating with the conduit and having an unobstructed opening in the wall thereof and leading to the atmosphere, and a confined sealing member within the chamber and normally bearing upon the rim of the opening under the pressure of the liquid for sealing the opening, the sealing member being made of solid soft rubber material, and the size of the opening being related to the thickness and hardness of the rubber and to the pressure applied to cause a portion of the rubber to flow through the opening and to pulsate outside the opening in accordance with pump pulsations.

3. A cushion dome for a conduit having means for pumping a liquid therethrough under pressure, comprising a housing having a chamber communicating with the conduit and having an unobstructed opening in the wall thereof and leading to the atmosphere, and a confined sealing member within the chamber and normally bearing upon the rim of the opening under the pressure of the liquid for sealing the opening, the sealing member being made of solid soft rubber material, and the size of the opening being related to the thickness and hardness of the rubber and to the pressure applied to cause a portion of the rubber to flow with respect to the opening and to pulsate in response to pump pulsations.

References Cited in the file of this patent

UNITED STATES PATENTS

| 144,141 | Ricketts | Oct. 28, 1873 |
| 2,495,693 | Byrd et al. | Jan. 31, 1950 |

FOREIGN PATENTS

| 104,257 | Australia | June 15, 1938 |
| 17,403 | Great Britain | Aug. 6, 1896 |